July 14, 1942.  A. F. PITYO  2,290,119
METHOD AND MEANS FOR MAKING BOTTLE CAPS
Filed Aug. 3, 1940    9 Sheets-Sheet 1
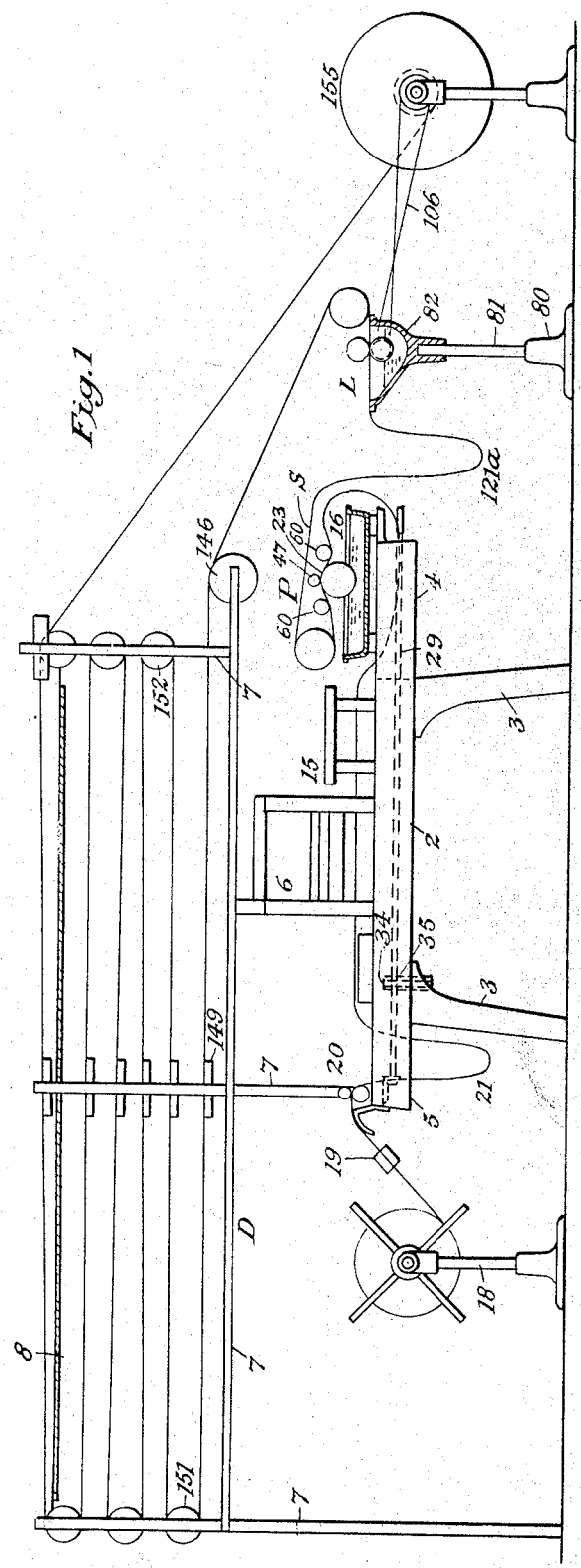
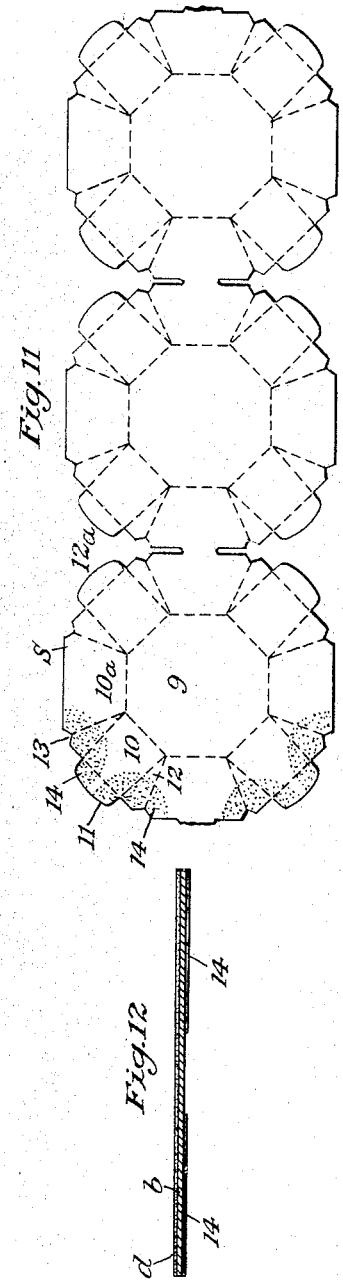
INVENTOR:
Albert F. Pityo
BY Otto Nordon
HIS ATTORNEY

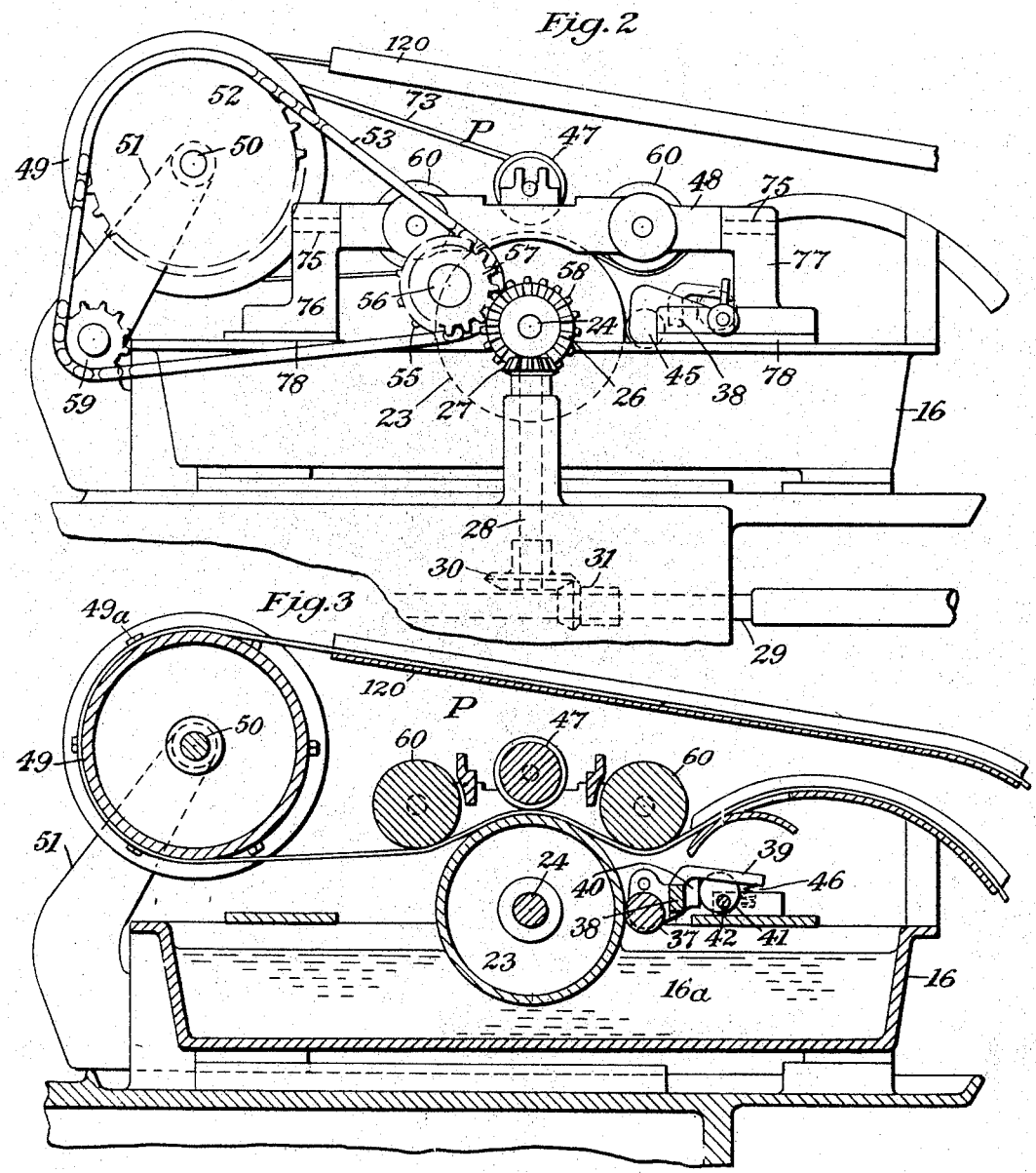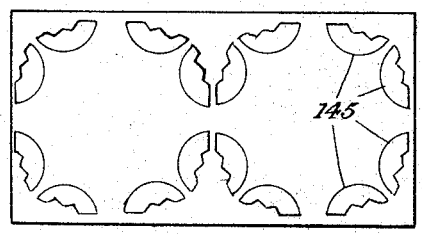

July 14, 1942.  A. F. PITYO  2,290,119
METHOD AND MEANS FOR MAKING BOTTLE CAPS
Filed Aug. 3, 1940  9 Sheets-Sheet 3
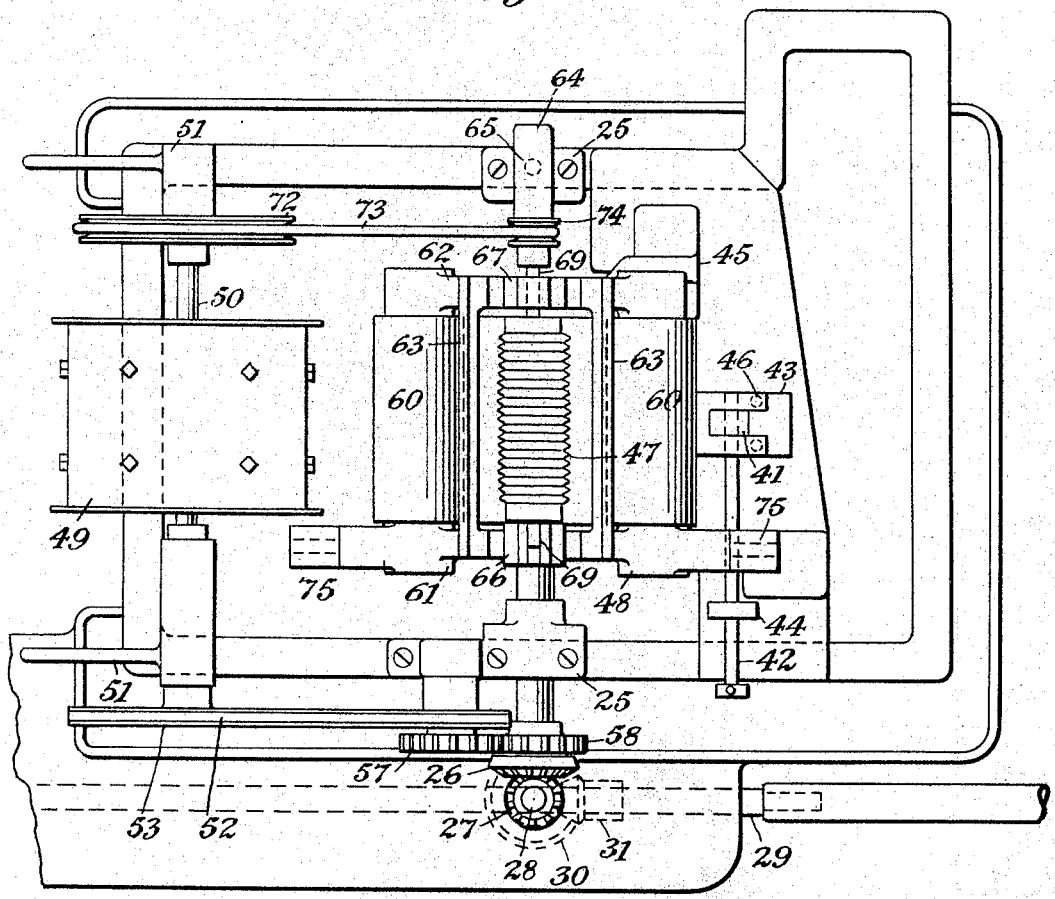
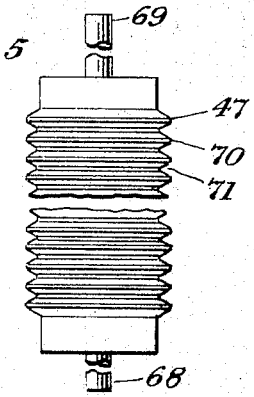
INVENTOR:
Albert F. Pityo
BY Otto Nordon
HIS ATTORNEY

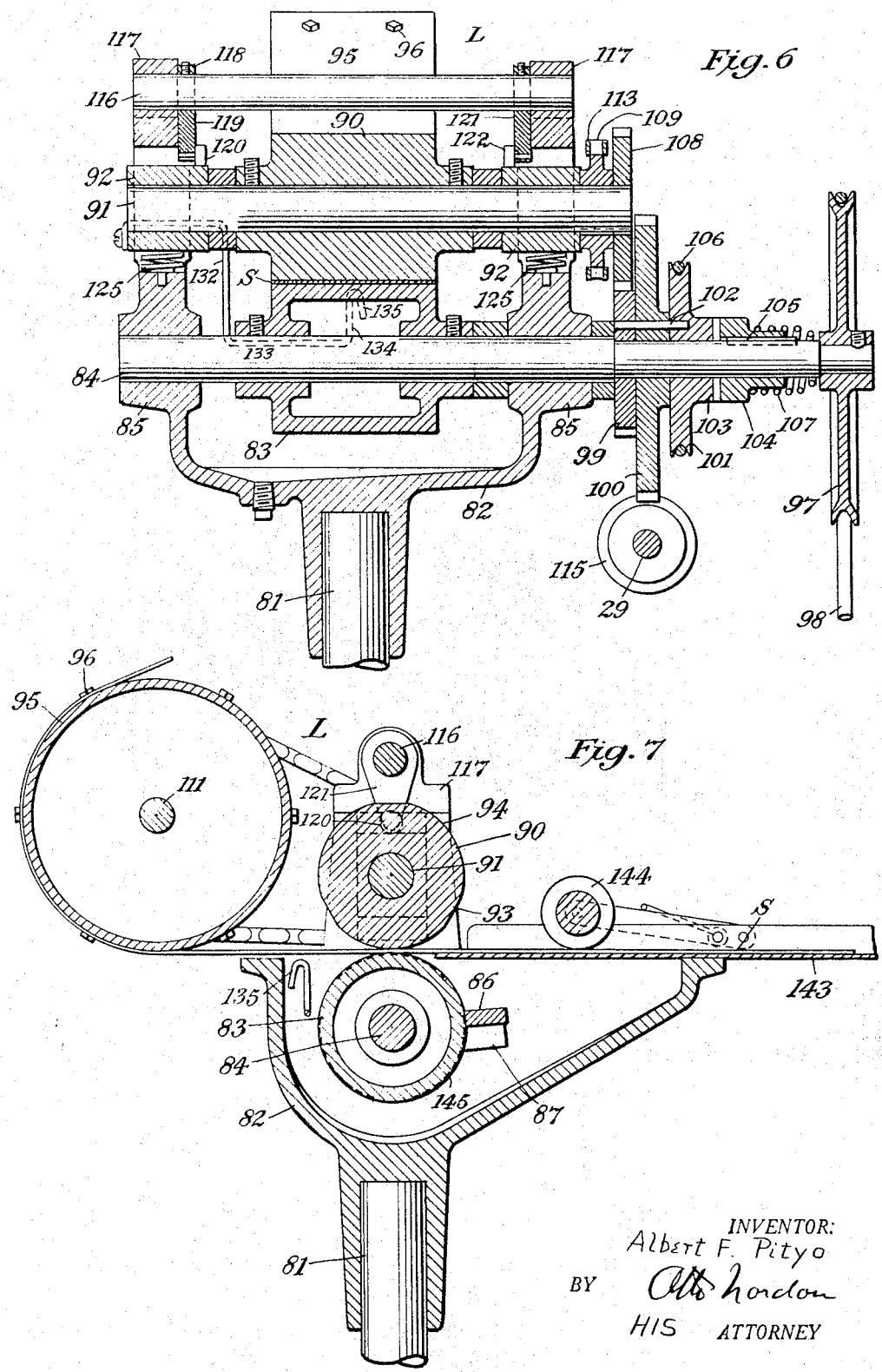

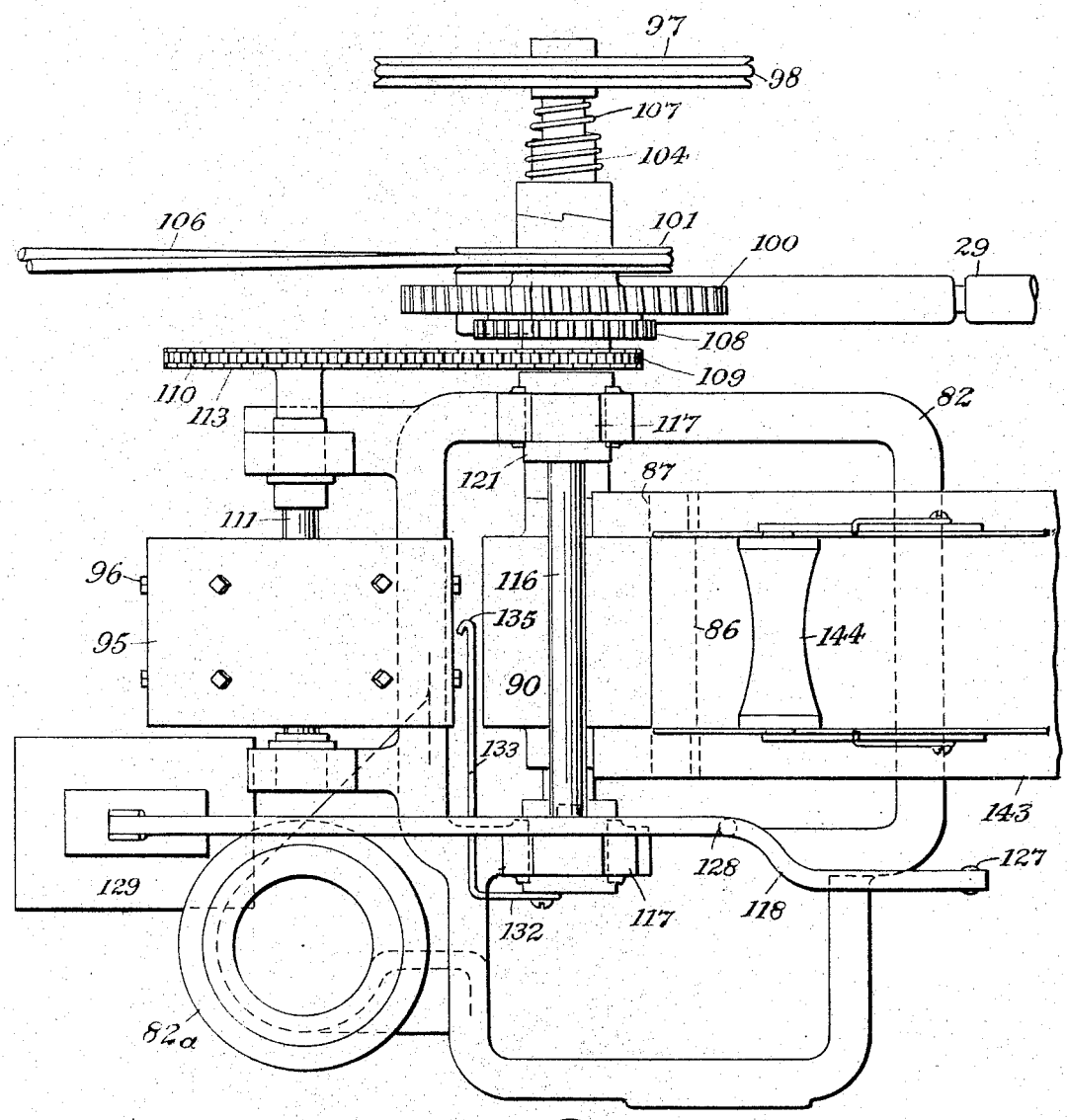
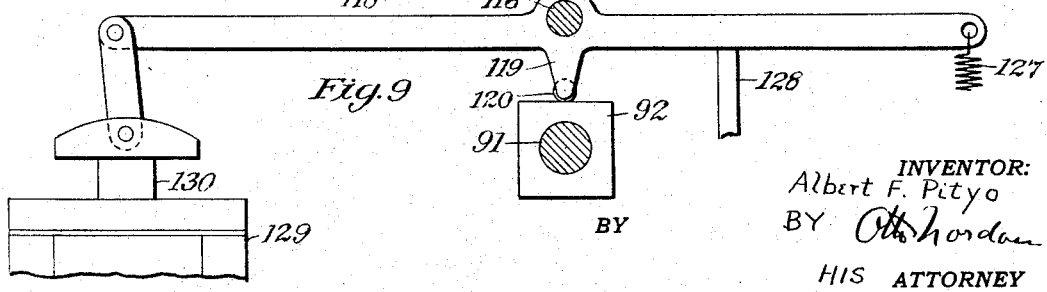

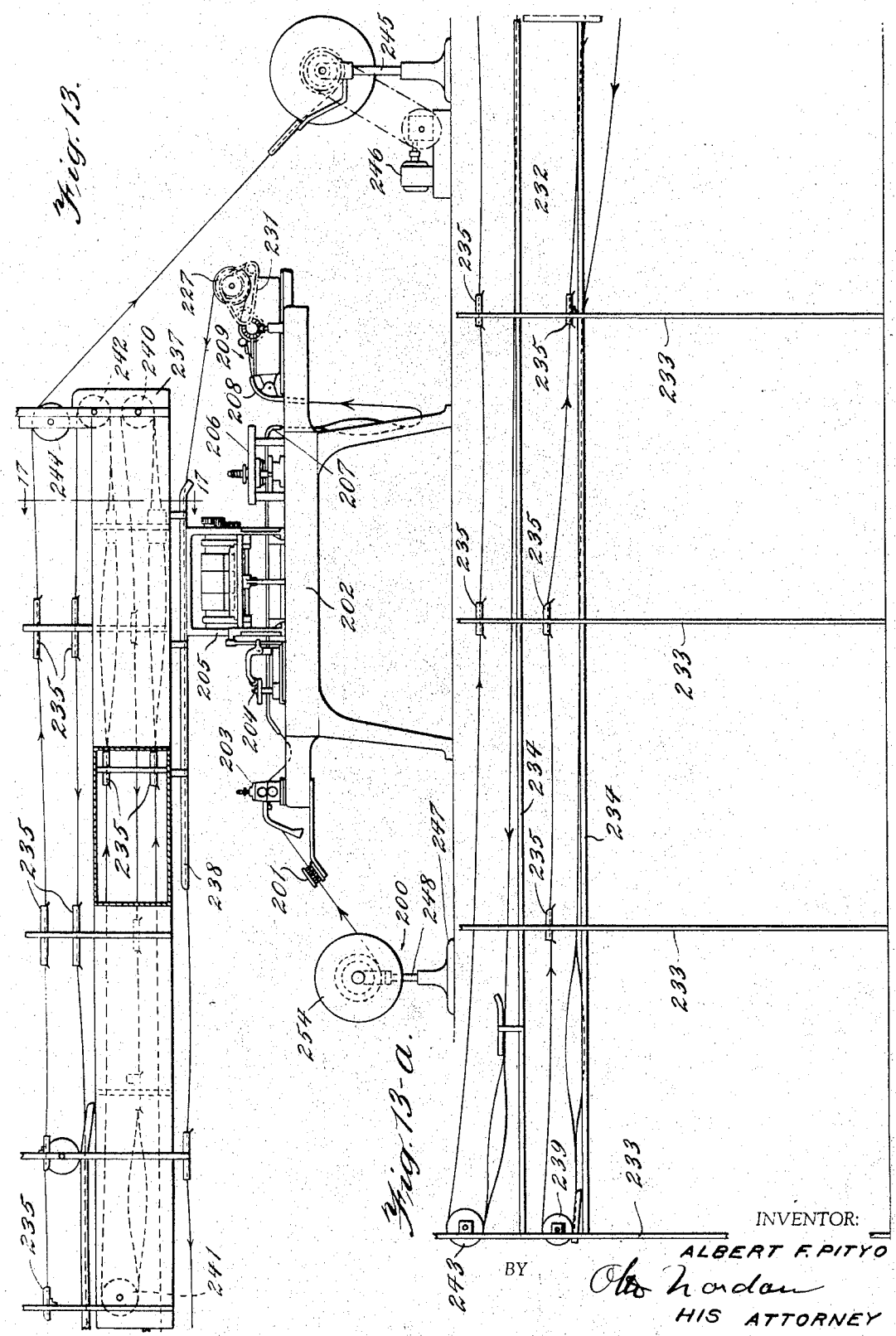

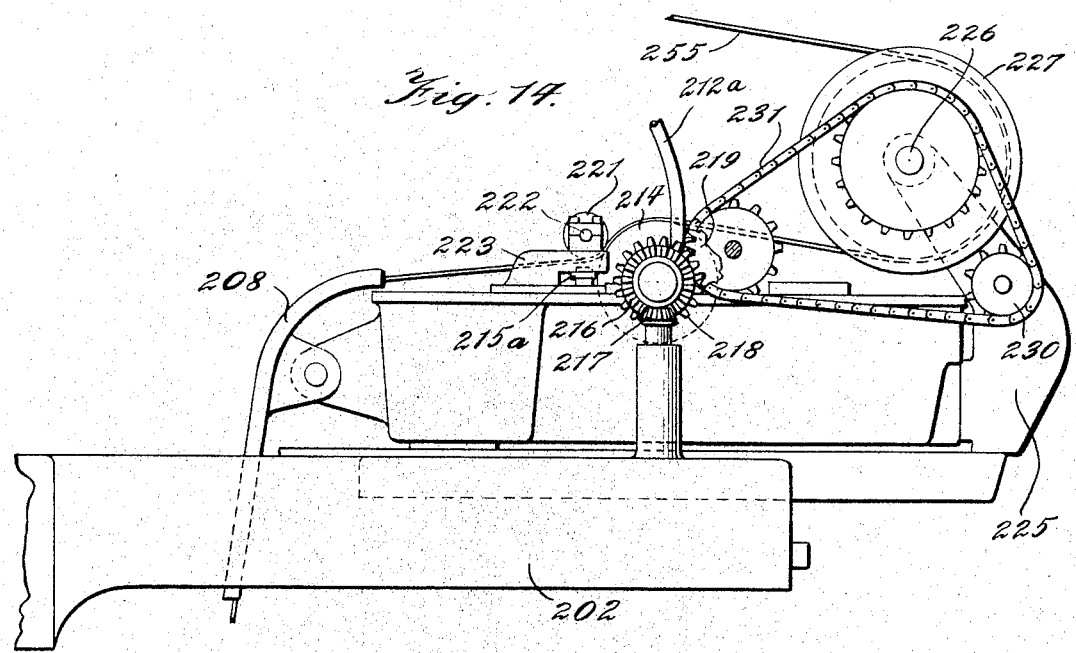
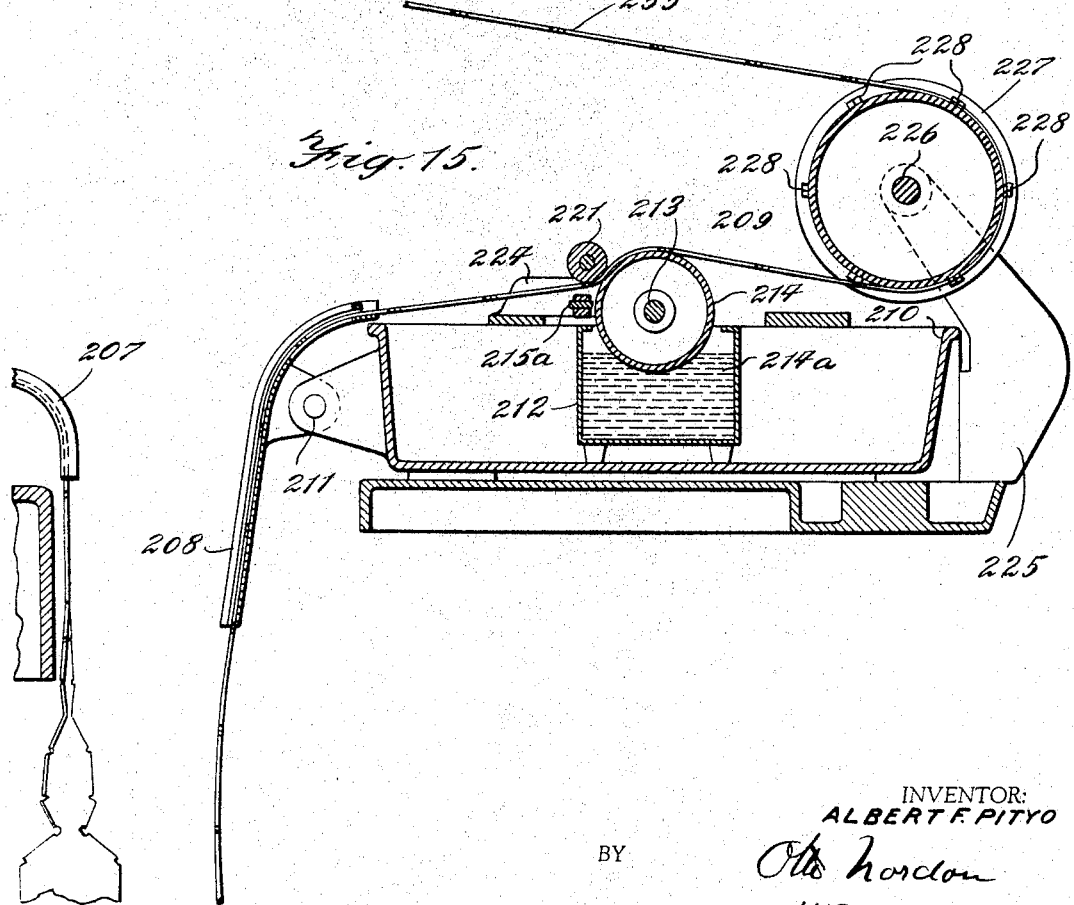

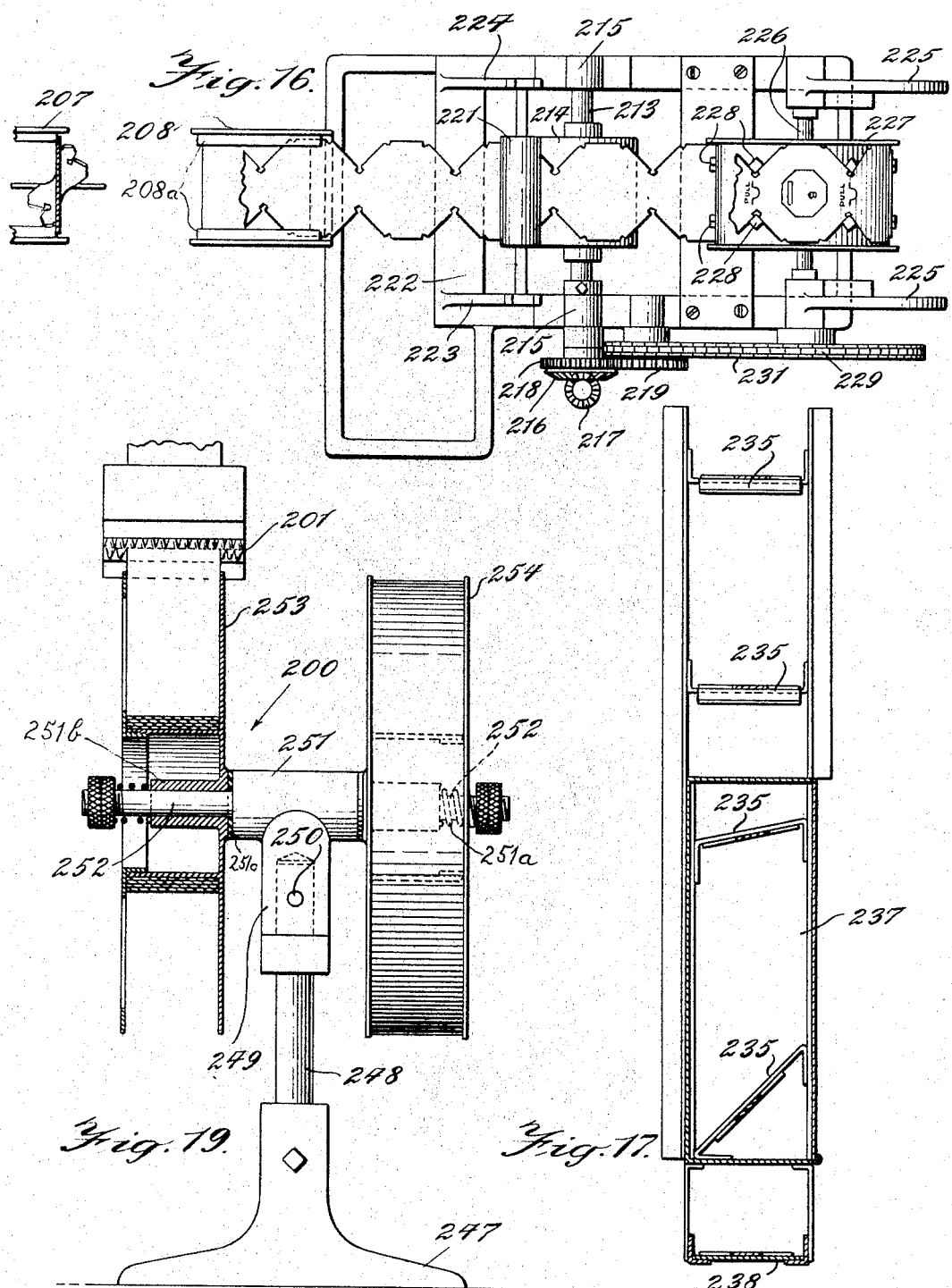

July 14, 1942.  A. F. PITYO  2,290,119
METHOD AND MEANS FOR MAKING BOTTLE CAPS
Filed Aug. 3, 1940   9 Sheets-Sheet 9
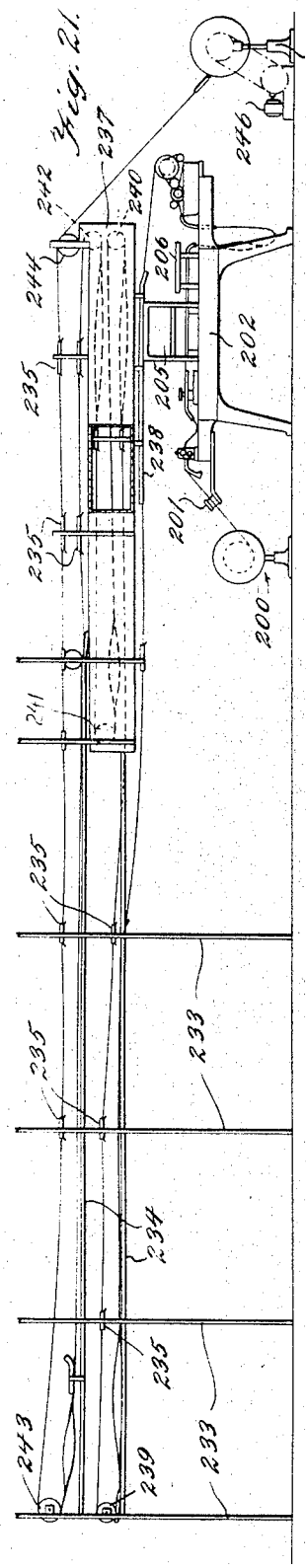
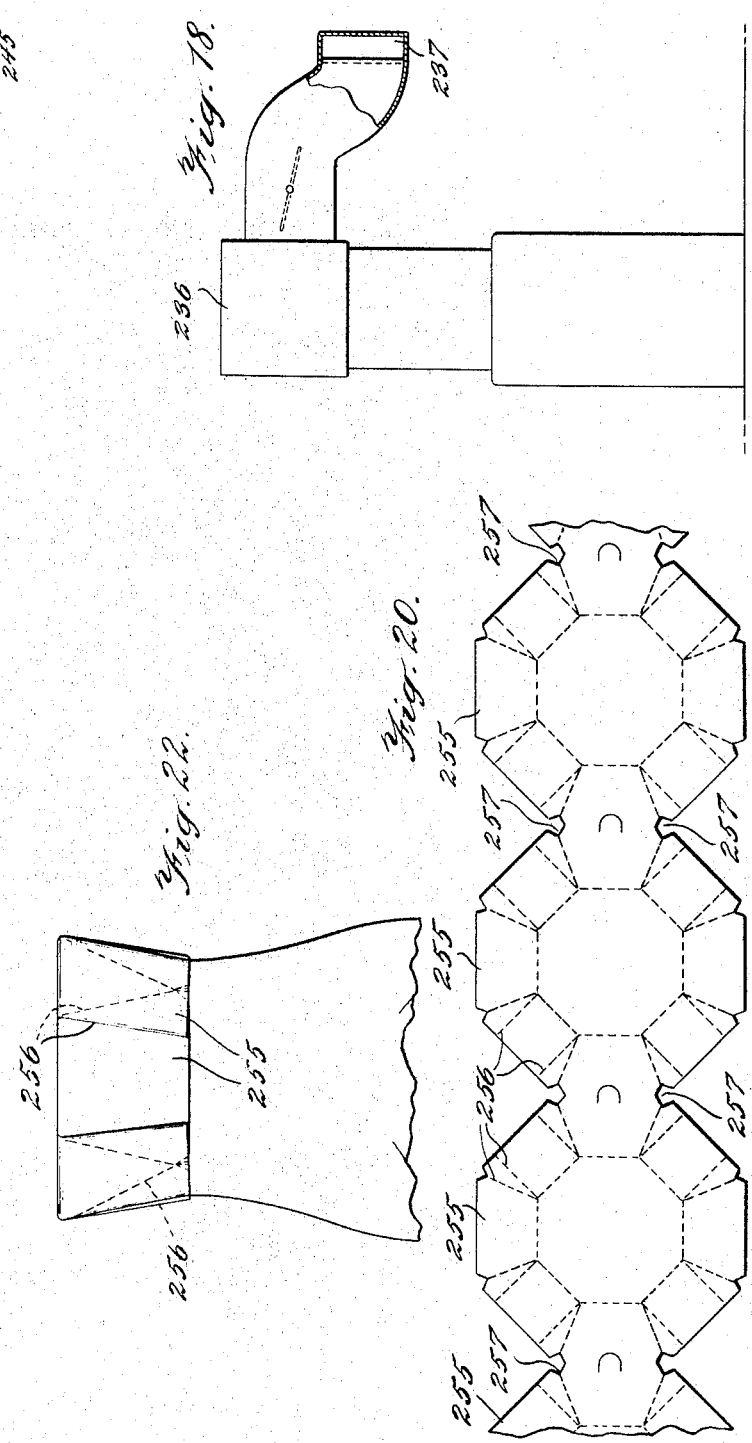
INVENTOR:
ALBERT F. PITYO
BY
HIS ATTORNEY

UNITED STATES PATENT OFFICE 2,290,119

METHOD AND MEANS FOR MAKING BOTTLE CAPS

Albert F. Pityo, Clifton, N. J., assignor to Tristate Cap and Cap Machinery Company, Incorporated, Newark, N. J.

Application August 3, 1940, Serial No. 350,297

16 Claims. (Cl. 91—16)

This invention relates to a method of and means for manufacturing bottle-cap blanks in continuous strips.

As is well known, bottles containing beverages, such as for example milk, are frequently provided with hood-shaped caps in order to protect the mouths of the bottles from contamination. These bottle-caps, which consist of paper or any other suitable material, completely surround the mouths of the bottles and are fastened to the bottle necks. Various methods of fastening the hood-shaped caps to the bottles are known. The hoods may for instance be tied to the bottles by means of wire, staples, fastening tongues, etc., which often form a permanent part of the hood blanks. Another way of fastening the hoods is by means of a plastic, adhesive or similar substance provided on the hood. After activation of the adhesive substance, the skirt of the hood is folded about the bottle neck and pressure is applied in order to glue the skirt in position about the bottle neck. It is with this kind of hood-shaped bottle-cap that the present invention is primarily concerned, although certain features thereof are equally suitable for the first mentioned type of bottle-cap which is secured to the bottle by means of fastening tongues or the like.

An automatic machine for applying bottle-caps to bottles is described in my application Ser. No. 236,846 filed on October 25, 1938.

The present invention relates to means for manufacturing hood-shaped bottle-caps from paper or other material in the form of continuous flat strips ready for application to the bottles to be capped, for instance by means of a machine as described in my above-mentioned application. Two forms of the present invention are described in the following.

One form of the invention relates to a machine for making hoods which are waterproofed on one side and provided with an adhesive on the other side.

A second form of the invention covers means for making hoods which are treated only on one side. This type of hood is provided for instance with a thermoplastic which is a good waterproofing substance as well as a very efficient cement when heat is applied to it.

Thus, an object is to provide a mechanism for applying the waterproofing compound on one side of a strip of the blanks and then to apply predetermined portions of suitable adhesive on the opposite side of said strip.

Another object is to associate the foregoing features in a machine which is adapted to form the blanks and print on them in a continuous strip and wind the same into a roll of blanks.

An object of the invention is to provide means adapted to advance a continuous band of paper or other material, stamp out the hood-blanks in the shape desired, but without severing the individual blanks from one another, print the name of the product or other legend onto each blank, score the blanks along predetermined lines to facilitate their application to the bottles, dry the blanks and wind the strip of finished blanks onto a reel.

Another object of the invention is to provide a method, consisting of a series of steps, for efficiently transforming a plain band of paper or the like into a strip of cut out, scored, printed and waterproofed hood-blanks, ready for application.

A further object of the invention is to provide a method and means for simplifying the drying of the treated blanks, more especially to prevent the treated surface of the strip from contacting the rollers over which it has to run during the drying operation.

I accomplish these and other objects, as will more fully appear hereafter, by the method and means described in the following specification and illustrated in the accompanying drawings, in which—

Fig. 1 is a side elevation partly in longitudinal vertical section showing the general arrangement of my improved machine.

Fig. 2 is an enlarged side elevation, showing the waterproofing mechanism.

Fig. 3 is a longitudinal vertical section of Fig. 2.

Fig. 4 is a plan of Fig. 2.

Fig. 5 is an enlarged detail plan of one of the rollers which form part of the mechanism.

Fig. 6 is a transverse vertical section of the mechanism for applying adhesive to a strip of cover blanks.

Fig. 7 is a longitudinal vertical section of Fig. 6.

Fig. 8 is a plan of Fig. 6.

Fig. 9 is a detail of a safety mechanism which is attached to the adhesive applying means.

Fig. 10 is a development of the impression cylinder of said adhesive applying means.

Fig. 11 is a plan of a strip of blanks made by the mechanism, and

Fig. 12 is a transverse section of one of the blanks.

Fig. 13 is a side-elevation of the second form of the invention, with a part at the extreme left broken away;

Fig. 13a is a continuation of Fig. 13 at the extreme left thereof;

Fig. 14 is a detail view, in side-elevation, of the coating device shown in Fig. 13;

Fig. 15 is a longitudinal sectional view of the device shown in Fig. 14;

Fig. 16 is a top-plan view of the device shown in Fig. 14 and its adjacent parts;

Fig. 17 is a sectional view of part of the drying apparatus;

Fig. 18 is a side-elevational view, partly in section, of the same;

Fig. 19 is a detail view of the carrier for the paper rolls;

Fig. 20 illustrates part of a strip of hood blanks;

Fig. 21 is a side-elevational view of the entire machine;

Fig. 22 illustrates the upper part of a bottle carrying a protective hood according to the invention.

Referring to Fig. 1, the numeral 2 indicates the base of the main machine and said base is preferably mounted on legs 3 and it has a forward extension 4 and a rear extension 5. Mounted on the base 2, is a printing mechanism 6, which may be of any suitable form, and its details are not herein shown. This is adapted to print labels and other matter which it may be desired to use on the container covers.

On the forward extension 4 of the base is mounted the waterproofing mechanism P, and forward of the latter but on a separate support, is the adhesive applying mechanism L. On the base 2 and above the printing mechanism and extending rearwardly, is a drying apparatus D mounted on a suitable frame 7, and including a casing 8 through which heated air is forced from any suitable source of supply. Various parts pertaining to this apparatus will be more fully described hereinafter.

One form of a strip of container cover blanks to be treated, is illustrated in Figs. 11 and 12, wherein each blank consists of a central portion 9 and two alternating types of panels or sections 10 and 10a. The sections 10 have short tabs 11 at their outer ends and the other type 10a is wedge shaped and without tabs. Between the panels are triangular connecting portions 12 and at the corners of the blanks are notches 13, and 14 indicates areas of adhesive. In Fig. 12, b indicates the material of the blank, which is usually of paper of 10 to 11 points in thickness and somewhat pervious to moisture, d indicates a coating of paraffin on one side of the blank and 14 denotes the adhesive.

A strip of paper is cut out, scored and perforated to provide a series of connected blanks, by any suitable means, which are herein termed the stamping means and which are preferably located at 15. Said stamping means may be of any suitable form, and they are not herein particularly shown.

On the forward extension 4 is mounted the waterproofing mechanism P which preferably employs liquid paraffin which is contained in a reservoir or tank 16. The paraffin is maintained in a liquid state preferably by electrical heating means (not shown).

The strip material for the blanks is preferably carried on a reel 18 and said material is unwound from the reel and carried between a pair of cleaning brushes 19 and between the tension rollers 20, mounted on the rear extension 5, and said strip material is then fed to a suitable strip feeding mechanism (not shown), which forms a loop of said strip material at 21. The feeding mechanism is carried on the base 2 immediately anterior the printing mechanism 6, to feed the blank strip material into the printing mechanism. This operates at a very high speed, with a positive and exact stroke.

The various parts which make up the waterproofing or paraffining mechanism are illustrated in Figs. 2 to 5 inclusive. Mounted midway of the reservoir 16 is a waterproofing or paraffining cylinder 23, partly immersed in the liquid paraffin 16a, and secured to the shaft 24 which is journaled in bearings 25 on the walls of the reservoir. The shaft 24 is driven by a bevel gear 26 secured to said shaft, and said gear 26 is rotated by a smaller bevel gear 27, secured to a vertical shaft 28 which is journaled in the base 2.

Extending along the under side of the base 2, is a horizontal shaft 29 suitably journaled on said base. Secured to the vertical shaft 28 is a bevel gear 30 meshing with a smaller bevel gear 31 secured to the shaft 29. The shaft 29 is connected by suitable gearing at its rear end to the drive of the tension rollers 20. Spur gears are provided which gear the tension rollers together. The shaft 29 is driven by a sprocket 34 secured to said shaft and said sprocket 34 is rotated by a chain 35 driven by a sprocket on the main shaft of the machine. The shaft 29 extends forward and it drives the adhesive applying mechanism and it is connected to the means for rotating the final winding reel.

The reference numeral 37 indicates a regulating roller to control the thickness of the paraffin film on the cylinder 23. The roller 37 is journaled in a turnable member 38, which has portions 39 extending toward the front part of the reservoir, and a projection 40, which is adapted to be pressed by the eccentric 41, which is secured to the operating rod 42, which is journaled in the blocks 43 and 44. 45 indicates the supports on which the member 38 is pivoted and 46 are springs for causing the return movement of the parts when the operating rod 42 is turned oppositely to its operating direction.

Mounted over the reservoir 16, is a transversely annularly ridged roller 47, carried on a turnable frame 48. There is a toothed flanged cylinder 49 which is secured to a shaft 50 journaled in bearings 51 which are bolted to the walls of the reservoir. The cylinder 49 is rotated by means of the sprocket 52 which is secured to the shaft 50. A chain 53 drives said sprocket and said chain 53 is driven by a smaller sprocket 55 which is journaled on the stud 56. The sprocket 55 is driven by means of the spur gears 57 and 58, the former being secured to the sprocket 55 and the latter being secured to the shaft 24 and meshing with the gear 57 to drive the same. 59 is a tension sprocket to produce an even tension on the chain 53.

The frame 48 also turnably supports the tension rollers 60, which carry the strip of blanks over the upper part of the cylinder 23 and said frame 48 has a front branch 61, a rear branch 62, and connecting portions 63. Joined to the rear branch 62 is an extension 64 by which the frame 48 is held in working position by means of the bolt 65.

The branches 61 and 62 carry the bearings 66 and 67 which journal the extensions 69 of the roller 47. The latter has a plurality of V-shaped annular ridges 70 separated by grooves 71 and said ridges 70 have flatted peripheries.

Secured to the shaft 50 is a grooved pulley 72 which is connected by the belt 73 to the pulley 74 which is secured to the respective extension 69 of the roller 47. The branch 61, on the side next to the driving chain 53, is pivoted by the pivot pins 75 to the uprights 76 and 77, whose plate 78 is secured to the walls of the reservoir. By unfastening the bolt 65, the whole frame 48 can swing upwardly about said pivot pins 75, when it is required to adjust the mechanism. The roller 47 is preferably held spaced above the cylinder 23, about .004 inch, by means of said adjustment of the frame, and the bolt 65 holds the frame in said adjusted position.

The adhesive applying mechanism is particularly illustrated in Figs. 6 to 10 inclusive. It is mounted on a stand having a base 80 which is bolted to the floor. A standard 81 is secured to the base 80 and a reservoir casting 82 is secured to the standard 81. Carried in the front part of the reservoir casting 82 is the impression cylinder 83, which is secured to the shaft 84, which is journaled in the bearings 85 of said casting. An adjustable scraper 86 is supported on lugs 87 which are secured to the casting 82.

Referring to Fig. 10, the impression cylinder 83 is provided with a plurality of recesses 145 of about .008 inch in depth, shaped as in Fig. 10, and spaced to correspond to the adhesive areas indicated by 14 in Fig. 11. Above the impression cylinder 83 is a presser cylinder 90 which is secured to the shaft 91, which is journaled in the movable bearings 92, which are carried in suitable slots of the casting 82. The presser cylinder 90 is provided with planar portions 93 and portions 94 of normal diameter which are intermediate the planar portions 93.

A continuous strip of blanks S is adapted to be fed between the cylinders 83 and 90 and a flanged toothed cylinder 95 is provided to feed said strip. Pins 96 which are held in holes of the cylinder 95, are adapted to enter the perforated parts 12a of the strip of blanks.

The cylinder 83 is continuously rotated by means of the pulley 97 which is driven by the belt 98 which is actuated by suitable means (not shown). Journaled on the shaft 84, next to the right hand bearing 85 is a gear 99. Next to the gear 99 is a worm wheel 100, and next to the worm wheel 100 is a grooved pulley 101. The members 99, 100 and 101 are coupled by a pin 102. A clutch 103 is formed on the hub of the pulley 101 and a clutch member 104 is slidably mounted on the shaft 84. Said clutch member 104 is prevented from turning on shaft 84 by the key 105 and said member 104 is pressed toward the pulley 101 by the spring 107.

There is a spur gear 108 secured to the shaft 91, and coupled to said gear is the sprocket 109. There is a sprocket 110 secured to the shaft 111, to which is also secured the cylinder 95, and said sprocket 110 is driven by the chain 113, which is connected to the sprocket 109 which turns with the shaft 91.

Meshing with the worm wheel 100 is a worm 115 which is secured to the shaft 29, which extends beyond the extension 4 for this purpose. Thus the mechanism for applying adhesive is in registration with the printing mechanism 6 and stamping mechanism 15. Over the cylinder 90 is a shaft 116 carried in bearings 117, and secured to said shaft is a lever 118 adjacent the left hand bearing 92 of the shaft 91. Said lever 118 has an extension 119 which carries an anti-friction roller 120, and secured to the shaft 116, adjacent the right hand bearing 92, is a short lever 121 which carries an anti-friction roller 122. Both rollers 120 and 122 press against their respective bearings 92, in order to force them downward. Springs 125 urge said bearings 92 upwardly and a spring 127 which is secured to the lever 118 normally holds said lever in the working position against the stop pin 128, as shown in Fig. 9.

At the left hand end of the lever 118 is a solenoid 129, whose core 130 is adapted to be drawn downwardly when the main power circuit is opened. Said core 130 is pivotally connected to the adjacent end of Fig. 9. The rollers 120 and 122 are thus moved upwardly, the roller 120 being moved, for example, above the position which is shown, in Fig. 9, so that the springs 125 cause the bearings 92 to rise, together with the shaft 91 and cylinder 90. Thus the presser cylinder is rendered independently inactive when the main machine is idle. The spring 127 provides working pressure for the cylinder 90 during the normal operation of the machine so that the portions 94 press the strip against the recesses 145 in the impression cylinder 83 as it revolves and thus causes the adhesive to adhere to the selected areas of the strip.

Suitable means are also provided for raising the strip of blanks S off the impression cylinder 83 when the main machine is idle. The said means embody a bent member 132 which is secured to the left hand movable bearing 92. Said number 132 extends to the front of the reservoir casting 82 and it then extends toward the impression cylinder 83 at 133. It then extends upwardly at 134 and it has a hook-shaped part 135 under the strip S. When the respective bearing 92 rises, it lifts the member 132 which raises the strip S by pushing element 135 against the under side of the strip.

The printed, stamped and scored strip of blanks S passes from the mechanism at 15, downwardly under the reservoir 16 which holds the liquid paraffin, and the strip then passes around said reservoir to the upper part of the paraffining mechanism P. The strip passes under the tension rollers 60 and the ridged roller 47, over the paraffining cylinder 23, which makes light contact with the under side of the strip. The strip takes up a coating of paraffin from cylinder 23. The strip is lightly pressed by the ridged roller 47 against cylinder 23. The strip then passes around the cylinder 49 and the strip is fed by the pins 49a, which enter the cut out spaces 12a between the blanks.

The strip S passes from the cylinder 49 to the guide plate 120a from which it is formed into a loop at 121a and the strip then passes upwardly to the adhesive applying mechanism L, where it moves along the guide plate 143 and under the tension roller 144. It then passes between the impression cylinder 83 and the presser cylinder 90 and the strip there takes up areas of adhesive 14, from the adhesive which is carried around in the recesses 145 of the cylinder 83. The cylinder 95 causes the strip S to move by means of its pins 96 and the strip then passes out of the mechanism L to the cylinder 146 rotatably mounted on the frame of the drier D. The drier has rear carrying rollers 151, front carrying rollers 152, and middle supports 149 and others if desired.

The coated strip S passes from the cylinder 146 to the lowermost carrying roller 151 and then rearwardly through the drier to the lowermost front carrying roller 152. Then it passes forward through the drier to the second carrying roller 151, then to the second front carrying roller 152. From there the strip passes to the third roller 151 and then to the front upper roller 152. It is then carried to the final winding reel 155 which is caused to rotate by means of the pulley 101 on the shaft 84, belt 106 and pulley 156 on the reel.

The strip is thus wound on the reel 155 into a roll of suitable size, which ordinarily contains from 3000 to 4000 blanks. Preferably, the paraffined sides of the blanks are placed inwardly in the roll and the adhesive coated sides are placed outwardly. Inasmuch as the adhesive which I prefer to employ will not adhere to paraffined or other waterproofed surfaces, the arrangement just described provides a form of roll wherein the adhesive treated parts will not adhere to other parts of the roll or package.

According to the second form of the invention, the blanks, which preferably consist of paper, are coated with a thermoplastic, e. g. a polyvinyl acetate, such as "Vinylite" (which is the trademark for a thermoplastic manufactured and sold by the Union Carbide Co.)

It will be noticed that the device illustrated in Fig. 13 is quite similar to that shown in Fig. 1. The main differences are the following: The coating device 209 is different from the paraffining apparatus which is illustrated in Fig. 13. Furthermore, in the embodiment of Fig. 13, the strip of blanks P is twisted before it reaches the coating device 209. The strip P is again twisted on its path through the drier as clearly shown in Figs. 13 and 13a. Further differences will become apparent in the course of the following description. As shown in Fig. 13, the paper P to be treated is unwound from a roll which is carried by support 200. This support comprises a base 247 and a standard 248. From support 200, the plain, untreated, and uncut paper band is led between the cleaning brushes 201 which are secured to the supporting table 202. The paper is fed by the feeding apparatus 203, which operates in known manner. From the feeding apparatus 203, the paper travels to step-wise feeding device 204 which is disposed on the support 202 and which serves to advance the paper band to the printing machine 205, which is likewise mounted on the support 202. The printing machine 205 prints the desired legend on the upper side of each blank. Since the conveyor 203 operates continuously, while the step-wise feeder 204 advances the paper only intermittently, a certain slack occurs, so that the paper forms a loop between elements 203 and 204. From the printing machine 205, which may be of any suitable design, the band of paper is advanced to the punching device 206. The same is disposed on support 202 and it is provided with a die which is adapted to stamp out the hood blanks to desired shape and to provide the same with score lines, as shown for example in Fig. 20. The punching operation takes place simultaneously with the printing stroke of the printing machine 205. The die of the punching device 206 is spaced a predetermined distance from the printing machine 205, so that the printed matter is exactly positioned with respect to the contour of the cut blank. From the punching device 206, the strip of paper blanks P is led through the guide 207 to form a loop. The strip of blanks P is then twisted so as to reverse the strip. As a result of this reversal, the printed face of the blank is turned downward at the coating machine. The reversed strip P is then led up over the guide 208 to the coating machine 209, which is mounted on the supporting table 202. The coating machine 209 comprises a casing 210, to which the guide 208 is pivoted at 211. Two leaf springs 208a are provided on guide 208 in order to tension the strip, whereby the latter passes in taut condition over the cylinder 214. The casing 210 is provided with a trough 212, which contains the coating material in liquid form. The liquid in the trough is kept at a pre-determined level by means of conduit 212a, which leads to a storage tank (not shown) which contains the coating material. The coating material is replenished in the trough 212, at the same rate as it is used up, by means of a float or any other suitable control device. Shaft 213, which carries the cylinder 214 which applies the coating material, is journalled to the trough 212 by bearings 215. Shaft 213 is rotated by means of driving gear 217, which meshes with bevel gear 216, which is keyed to shaft 213. The shaft 213 also carries a gear 218, which drives a gear 219 which is rotatably supported by casing 210. A sprocket wheel 220 is connected to gear 218 and adapted to be rotated therewith. Counter-roller 221 is disposed adjacent the cylinder 214 and serves for pressing the strip of blanks P against the cylinder 214 in order to apply the coating material. Counter-roller 221 is carried by shaft 222, which is journalled in bearings 223 and brackets 224. The coating cylinder 214 is partially immersed in the coating liquid 214a. In order to control the amount of liquid applied by the cylinder 214, an adjustable scraping knife 215a is provided. By moving knife 215a closer to or farther away from cylinder 214, the amount of coating material can be regulated. The supporting table 202 is provided with brackets 225 on which the shaft 226 is rotatably mounted. A flanged cylinder 227 is carried by shaft 226. Diamond-shaped studs 228 are provided on cylinder 227 for the purpose of positively engaging the notches 257 of the strip of blanks P. Sprocket 229 is secured to shaft 226 and said sprocket 229 is adapted to rotate shaft 226 together with cylinder 227. Tension sprocket 230 is supported by bracket 225 for cooperation with sprockets 220 and 229. Sprockets 220, 229 and 230 are interconnected by means of the driving chain 231.

It will be noted that after the twist at I, the strip of blanks P forms a loop and travels face-down over the guide 208 and onto the cylinder 214 where the printed face of the blanks is covered with coating liquid which is picked up by cylinder 214 from the trough 212. The counter roller 221 assures proper and even contact of the blanks with cylinder 214. From the coating cylinder 214, the blanks travel to the bottom of flanged cylinder 227. The blanks travel around the cylinder 227 so that the printed and coated surface always faces outwardly, as shown in Fig. 16. The studded roller 227 positively engages the strip of blanks issuing from the coating device 209. A positive engagement between the blanks and the cylinder 227 is important in order to maintain the loop between the punching device 206 and the coating device 209. It is especially important that this loop be maintained unaltered, because the blanks are twisted in the course of the loop at point I, so as to reverse them. This reversal is necessary in order to bring the printed face of the blanks in contact with the coating roller 214. For the purpose of maintaining a steady loop as above explained, the driving gear 217 is preferably connected to the main drive (not shown) for the conveyor 203, the intermittent feeding device 204, the printing machine 205 and the punching device 206. The different devices can thus easily be kept in synchronism.

From the flanged cylinder 227, the blanks travel to the drying apparatus 232. The drying apparatus comprises a plurality of vertical supports 233 which are connected together by horizontal bars 234. Rollers 239, etc., over which the strip of blanks passes back and forth, are provided. Guide pieces 235 on the supports 233 facilitate the movement of the strip of blanks. As shown in Figs. 13 and 21, the strip of printed and coated blanks travels face up from the flanged roller 227 onto guide 238. Before reaching the first roller 239, the strip of blanks is twisted and turned face down, so that the unprinted and uncoated surface of the blanks contacts the roller 239. After passing about the roller 239, it will be observed that the printed and coated side of the strip faces upward again. Shortly before reaching the next roller 240, the strip of blanks is twisted again in order to turn its printed and coated face away from the roller. The same reversal of the strip of blanks occurs at rollers 241, 242 and 243. After passing over roller 244, the strip of blanks is brought to the rewinder 245 which is actuated by motor 246. It will be clear that by using rollers 239 to 243, and by reversing the strip of blanks, a great saving in space is accomplished. Paper as well as other flexible materials can thus rapidly be dried without the use of very large drying chambers.

The drying apparatus described provides merely for air drying. If desired, a hot air drier 236 of known construction may be combined with the air drier. To this end, a tunnel member or conduit 237 is provided through which the strip of blanks travels. The hot air admitted to conduit 237 from the hot air blower 236 considerably shortens the drying period. With certain thermoplastics, I have found it desirable to air-dry the blanks for a short period before admitting the same to the hot air conduit 237. A cross-sectional view of the latter is given in Fig. 17. The cross bars serve to facilitate the travel of the twisted strip of blanks. The support 200 for the roll of paper to be treated is preferably constructed in the manner shown in Fig. 19. The support 200 comprises a base 247 to which a shaft 248 is secured. The upper end of shaft 248 projects into sleeve 249. The latter is movable on the shaft 248 and may be secured in any adjusted position by means of a pin 250. Sleeve 249 is integral with a cross-piece 251 which carries a shaft 252. The latter supports two drums 253, 254, for receiving two rolls of the paper to be treated. After the supply of roll 253 is exhausted, the cross piece 251 is swung about and drum 254 is ready to feed paper to the machine. Springs 251a exert a certain pressure upon drum sleeves 251b which are urged against leather washers 251c to prevent the drums from paying the paper out too rapidly.

A preferred form of strip is illustrated in Fig. 20. The individual blanks 255 are provided with score lines 256 and cut-outs 257. The former serve to facilitate the folding of the blanks around the bottle necks, while the latter are adapted to be engaged by the studs 228 provided on cylinder 227. It should be noted that these blanks 255 are even more simple in construction than those illustrated in Fig. 11. Blanks 255 may e. g. consist of plain paper which is covered only on its top surface with a layer of a thermoplastic such as "Vinylite," which is an excellent waterproofing substance. Thermoplastic coated blanks are readily secured to a bottom by heating the thermoplastic film. Under the influence of heat the thermoplastic becomes sticky and the hood may easily be cemented around the bottle neck. Once glued together, the hood cannot be detached without ripping the paper. The thermoplastic layer thus serves both as an adhesive and waterproofing agent. This type of blank is more practical than the paraffin blank, because it is simpler to produce, easier to attach to the bottle and better in performance.

A hood according to the invention as affixed to a bottle is illustrated in Fig. 22. One of the problems encountered in manufacturing printed, waterproofed and stamped out hood blanks from a plain strip of paper is the sequence of steps to be used. At first flush, it would appear simplest to stamp out the blanks from a strip of paper already waterproofed and then print the blanks with the desired legend.

However, after long research I discovered that the most efficient method consists of steps in the following sequence; unwind the strip of plain paper; print the same; stamp out and score the hood blanks; apply the thermoplastic or other waterproofing agent; apply adhesive if desired; and finally dry the blanks. This method, which produces better results than could be produced by any other sequence of steps, has never been practiced before as far as I am aware.

Various changes may of course be made in methods and devices disclosed herein without departing from the spirit and scope of this invention, and I do not wish to be understood as limiting myself to the exact features shown and described herein.

I claim:

1. Mechanism for feeding a strip of material from a certain point to a distant support, comprising means for feeding the strip face-up in forward direction toward the support, means for twisting the strip ahead of the support so as to turn its face down, means for leading the strip to the lower part of said support with the back of the strip in contact with said support, means for feeding the reversed strip about said support in U-turn fashion, and means for then feeding the strip in backward direction with the face of the strip facing upwardly after having passed said support, whereby contact between the face of the strip and the support is avoided.

2. A drying machine comprising a plurality of spaced apart and oppositely disposed rollers adapted to receive a continuous strip of material threaded back and forth over said rollers, said machine having means for feeding said strip in forward direction, means for twisting said strip to turn its face down ahead of the first roller, means for feeding the reversed strip to the lower part of the first roller and about the same in U-turn fashion, means for thereafter feeding the strip in backward direction toward the second roller, means for twisting said strip ahead of the second roller and guiding it over it from below in U-turn fashion and so on.

3. A machine of the character described, comprising a printing unit and a coating unit adapted to continuously print and coat a strip of hood blanks continuously passing through said units, means for providing a slack in the strip between said units so as to form an open loop, means for twisting said loop so as to turn its face down, means for maintaining said loop of sufficient length to permit automatic twisting during advancement of the strip, and means for feeding the reversed strip to the coating unit.

4. In a machine for printing and coating a continuous strip of material, a printing device adapted to automatically imprint the strip from above at predetermined intervals, a coating device adapted to automatically coat the strip from below, said printing and coating devices being spaced apart a sufficient distance to permit the strip to form a loop therebetween, said strip being initially inserted between said printing and coating devices to form an open loop, a twist being formed in the strip in the section of the loop to turn the strip face-down, conveying means feeding the strip through said printing device toward said loop, positive guiding means to positively engage and advance the strip from the loop to the coating device, said conveying means and positive guiding means being correlated, whereby the loop is maintained unaltered and successive lengths of said strip are automatically twisted, at the location of the original twist, while passing through the loop formation, said strip being fed face-down to said coating device to receive a coating on the turned down face thereof.

5. The device claimed in claim 4, in which said printing device comprises a movable printing element, the latter being disposed above the said strip and adapted to move downward upon said strip to imprint the same; and in which the said coating device comprises a rotatable cylinder disposed below and in contact with said strip, said cylinder applying coating material to the contacting surface of the strip.

6. The device claimed in claim 4, in which said strip is provided with cut-outs, and said positive guiding means comprises a cylinder provided with projections, the latter being adapted to engage the said cut-outs to positively guide the strip.

7. A device for reversing a strip of material, comprising conveying means for advancing said strip face-up, positive guiding means adapted to positively engage and advance said strip, said conveying means and positive guiding means being spaced apart, said strip being initially inserted between said means to form an open loop there-between, a twist being provided in the loop to turn the face of the strip down and advance it in reversed position to said positive guiding means, actuating means for said conveying and guiding means, the latter two means being correlated, whereby said loop is maintained and successive lengths of the strip automatically form a twist at the location of the initial twist.

8. A coating machine embodying means for applying waterproofing compound only to one entire side of a strip of blanks, and means for applying portions of adhesive to the opposite side of said strip.

9. A coating machine embodying means for applying liquid paraffin only to one entire side of a strip of blanks, means for applying portions of adhesive on the opposite side of said strip, and means to advance said strip in registration with the last-mentioned means.

10. A coating machine embodying an adhesive impression cylinder, a presser cylinder over the same cooperative therewith, means to rotate said cylinders oppositely, means to advance a blank strip between the cylinders, means to raise the presser cylinder when the machine is idle, and means to raise the portion of the blank strip lying between the cylinders when the machine is idle.

11. A method of forming a strip of printed and connected and water-proofed hood-blanks, which consists in feeding a continuous strip through a printing station, printing said strip at said printing station, then feeding said strip through a cutting-station, shaping said strip at said cutting-station to form a succession of joined blanks, each said blank being foldable into hood shape, each of said blanks having junction portions whose edges have inwardly extending notches, then feeding said strip through a coating station, coating only the entire printed face of the strip with light-permeable and water-proofing coating material at said coating station, setting the coating material and then reeling the strip.

12. A method according to claim 11 in which the strip is fed away from the coating mechanism by engaging the strip successively at said notches.

13. A method according to claim 11 in which adhesive is applied to selected areas of the uncoated face of the strip, said areas of adhesive being adapted to connect the parts of the blank to each other in cup-shaped form.

14. Mechanism for making a strip of connected hood blanks, comprising printing means, cutting and scoring means located after said printing means, said cutting means being adapted to shape the strip into a series of joined blanks which are respectively foldable into hood shape, waterproofing means which includes a roller applicator, guide means adapted to guide the shaped strip with its printed face in contact with the upper part of said roller applicator, and means adapted to feed the strip through said means.

15. Mechanism according to claim 14, in which said cutting means forms notches at the longitudinal edges of the parts of the strip which join the respective blanks, a power-driven feed roller located after the cutting means and having pins which engage said notches to feed the strip forwardly.

16. A method according to claim 11 in which the coating material is a thermoplastic adhesive, and the strip is maintained free of other adhesive.

ALBERT F. PITYO.